United States Patent
Saada

[19]

[11] Patent Number: 5,796,835
[45] Date of Patent: Aug. 18, 1998

[54] METHOD AND SYSTEM FOR WRITING INFORMATION IN A DATA CARRIER MAKING IT POSSIBLE TO LATER CERTIFY THE ORIGINALITY OF THIS INFORMATION

[75] Inventor: Charles Saada, Saint-Cloud, France

[73] Assignee: Bull CP8, Louveciennes, France

[21] Appl. No.: 852,567

[22] Filed: May 7, 1997

Related U.S. Application Data

[63] Continuation of Ser. No. 256,057, filed as PCT/FR93/01056 Oct. 27, 1993 published as WO94/10660 May 11, 1994, abandoned.

[30] Foreign Application Priority Data

Oct. 27, 1992 [FR] France ............................. 92 12786

[51] Int. Cl.$^6$ ..................................... H04L 9/00
[52] U.S. Cl. ............................. 380/25; 380/4; 380/9; 380/23; 380/49; 380/50
[58] Field of Search ..................... 380/4, 9, 23, 24, 380/25, 49, 50

[56] References Cited

FOREIGN PATENT DOCUMENTS

| | | |
|---|---|---|
| 0500245 | of 0000 | European Pat. Off. . |
| 0138320 | 4/1985 | European Pat. Off. . |
| 0140013 | 5/1985 | European Pat. Off. . |
| 0253722 | 1/1988 | European Pat. Off. . |

*Primary Examiner*—Bernarr E. Gregory
*Attorney, Agent, or Firm*—Kerkam, Stowell, Dondracki & Clarke, P.C.; Edward J. Kondracki

[57] ABSTRACT

The invention consists of writing at least one piece of information [I] and an image [I'] thereof into the accessible memory zone Ac of a portable object (1). This image [I'] is obtained by implementing a program of encipherment of the information [I]. This program takes into account at least the one piece of information [I], a first datum [Ks] that is external to the portable object and furnished to encipherment circuits (21) under the control of the person writing the information, and a second datum [Sid] that is diversified for each portable object (1). Later certification consists of verifying that an image [I'] has been obtained with the aid of the first and second data, so as to deduce from this that the associated information [I] is original.

18 Claims, 4 Drawing Sheets

METHOD AND SYSTEM FOR WRITING INFORMATION IN A DATA CARRIER MAKING IT POSSIBLE TO LATER CERTIFY THE ORIGINALITY OF THIS INFORMATION

This is a Continuation, of U.S. patent application Ser. No. 08/256,057, filed as PCT/FR93/01056 Oct. 27, 1993, published as WO94/10660 May 11, 1994, now abandoned.

The invention relates to a method for writing at least one piece of information on a data carrier which makes it possible to verify the originality of this information at a later time or in other words to show both that the information is authentic and that the data carrier on which it is located is indeed the one used when it was written.

Information is considered authentic when it has not been altered or modified relative to its original content.

If moreover the data carrier where the information is located is indeed the one that was used during the writing, then the information can be considered as original.

Conversely, if authentic information is not located on its original data carrier, it is a copy.

Numerous documents are issued by authorizing entities. These include official papers such as identity documents, diplomas, proofs of remittance. Sometimes to evaluate these documents, only the presentation of an original is valid.

Various methods have been contemplated to demonstrate the originality of such papers.

One known method consists of using a data carrier, generally paper or plastic, in which a filigree is embedded. Determining the presence of a filigree supports the assumption that the document present is original and was issued by an authorized entity. Nevertheless, sophisticated techniques can be employed to produce false documents that appear to be coherent. Either they have a perfectly imitated counterfeit filigree, or information not issued by an authorized person is placed on an original data carrier, hence one that has a genuine filigree, and fraudulently substituted for that. The determination of counterfeit documents requires a particular team of persons tasked with verification.

The main subject of the invention is accordingly a method for writing in a data carrier, and a system, by which it can be determined with certainty that information on a data carrier is original.

Highly advantageously, the method of the invention in its implementation uses a portable object with memory and processing circuits, such as a microprocessor or so-called smart card. Such an object has the characteristic of being capable of containing secret data and accessible data as well as programs that employ logical-mathematical functions. It may be issued to any person (bearer of the object) and may be substituted for any official paper or document of which it may be necessary to have an original.

According to the invention, a method for writing information (I) in a data carrier, enabling later verification of its originality, is characterized in that it consists of using as the data carrier a portable electronic object, and that it includes a writing phase in the course of which on the one hand, on request of an authorized person, when the object is connected to a suitable terminal, the information is written in a memory zone of the object that is writable and accessible for at least reading after having been written, and on the other hand, an image of the information is worked out by encipherment of this information, with the aid of at least a first datum, external to the portable object and furnished with encipherment circuits under the control of the person writing the information, and a second datum that is diversified for each object and taking into account a secret datum of the object, and in the course of which finally the image is written in the accessible memory zone of the portable object.

According to another characteristic of the invention, the method includes a phase of verification of the information contained in the memory zone of a portable object, in the course of which the object is connected to a suitable terminal, and it is determined that the image resulting from the encipherment of the information contained in this memory zone has been obtained by using the first and second data.

Accordingly, in order to be employed, the invention requires a portable object with processing circuits and a memory zone with a secret datum, as well as a memory zone accessible for writing, so as to write the information and its image, with this zone remaining accessible at least for reading after it has been written, especially at the time of later phases of verification or checking of the originality of the information. Writing and verification may be done with the aid of a suitable terminal to which the object is connected.

The invention is especially advantageous and makes it possible to arrive extremely reliably at the expected object.

In fact, the first datum, external to the portable object and furnished to encipherment circuits under the control of the person who writes the information, actually constitutes an encipherment key. A person not authorized to write information does not know or has no access to this key, so that he is incapable of writing information that would furnish a coherent image of that information.

A defrauder or counterfeiter is also incapable of copying information into some other object and associating it with a coherent image there.

The use of a diversified datum for each object at the time of writing in the accessible memory zone of an object in fact prohibits the same information, written by an authorized person from having the same image in two different objects. Consequently, in the case of a copy of information and its image in another object, the verification once again makes it possible to determine that the image is not coherent.

Finally, the use of a secret datum of the object prevents the bearer or authorized person to be capable of influencing the result of the encipherment.

In another characteristic, the method employs means for distinguishing between the original, a copy, and a counterfeit.

Further characteristics and advantages of the invention will become apparent from the ensuing description taken in conjunction with the accompanying drawings, in which:

FIGS. 1 and 2 schematically show two variants of devices that enable the complete or partial implementation of the invention;

Figure 6:
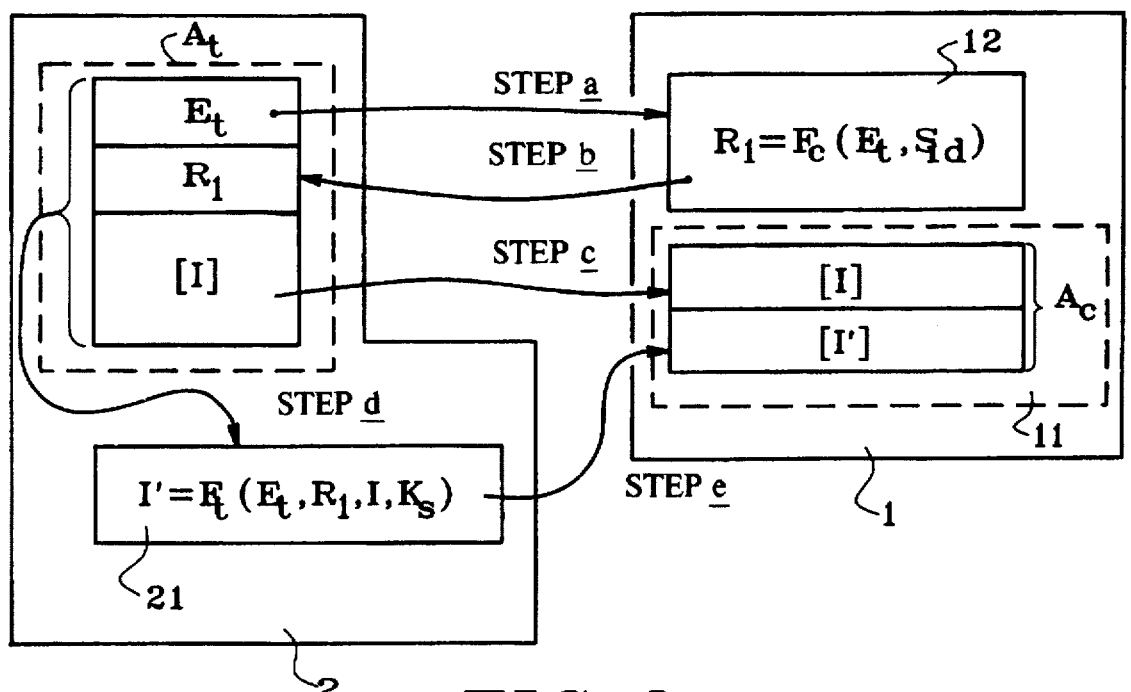
Figure 7:
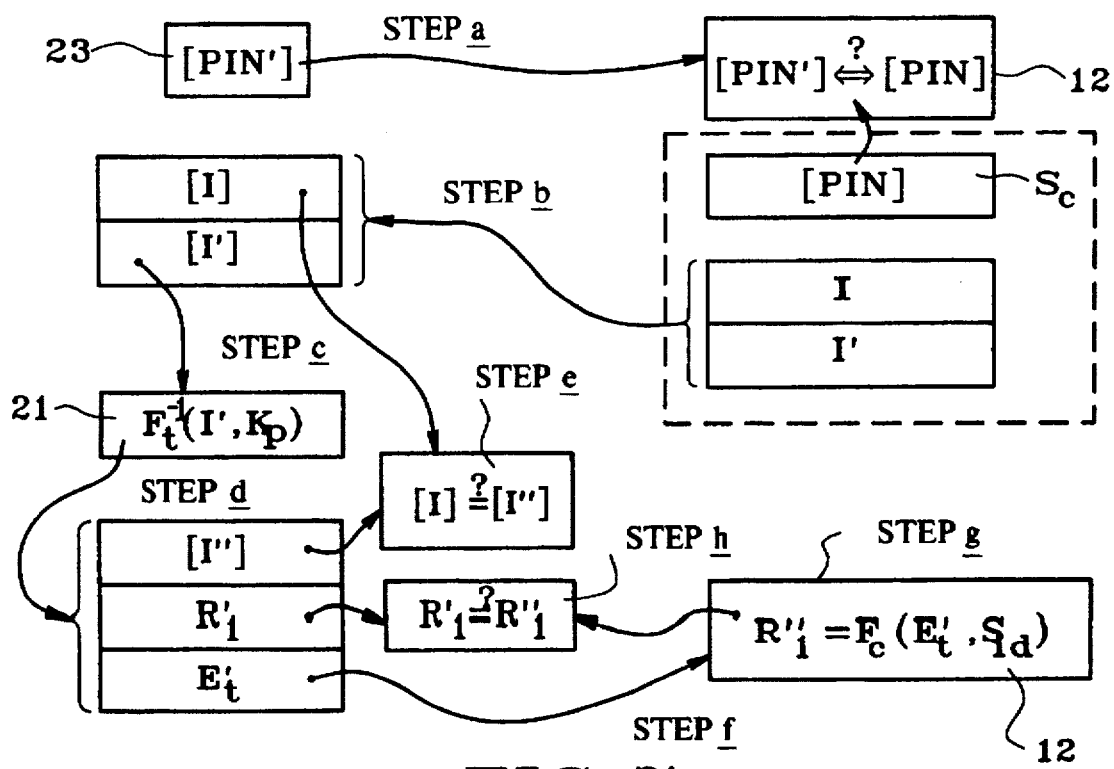

FIG. 6, in a preferred embodiment, shows the steps of writing information and its image; and FIG. 7, in a preferred embodiment, shows the steps of verifying the originality and authenticity of information.

Figure 1:
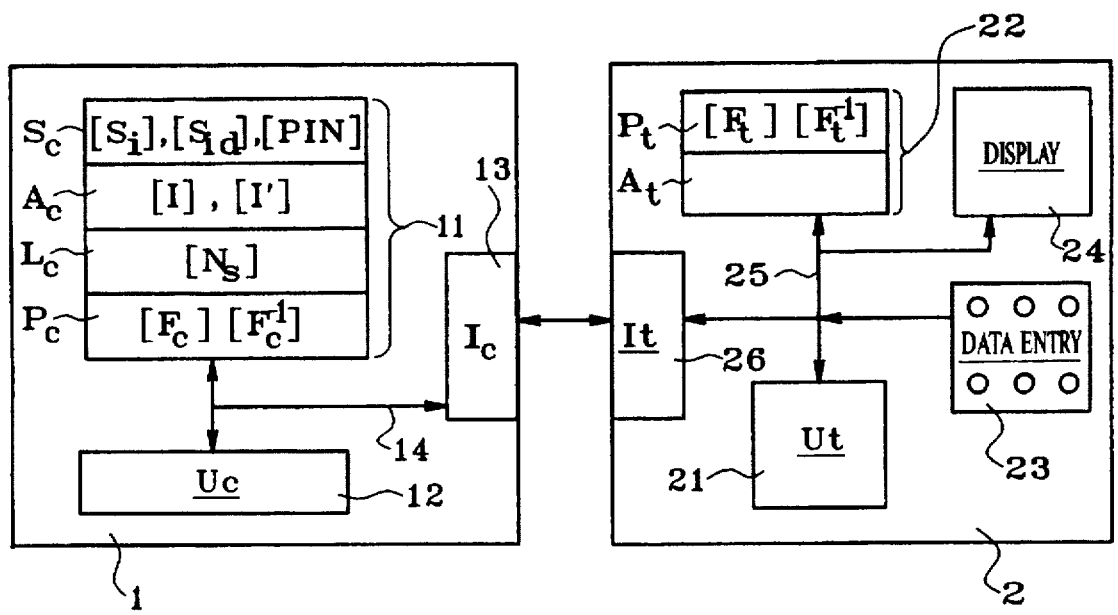
Figure 2:
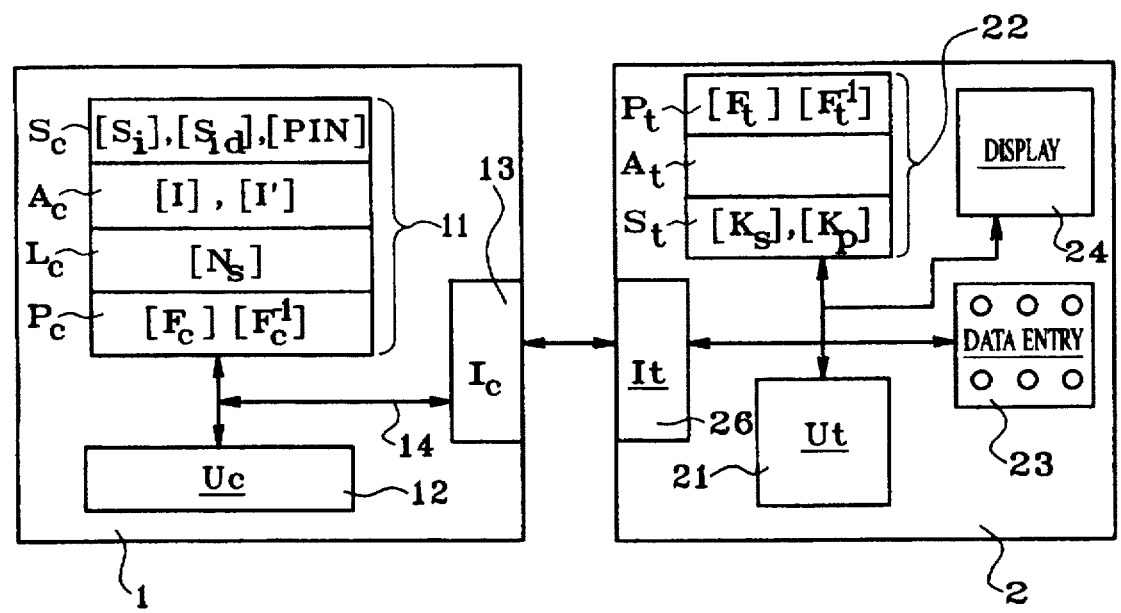

In FIGS. 1 and 2, two variants of devices enabling the complete or partial implementation of the invention are shown schematically, that is, devices that can be used either solely to write the information whose originality is to be certified later, or solely for verifying it, or for writing and verification.

As will be demonstrated later, the type of possible use of the devices of FIGS. 1 and 2 depends on the nature of the data and on the operating protocols (or programs) that these devices contain.

The device illustrated in FIG. 1 includes a portable object 1, such as an electronic microcomputer card, and a terminal 2 to which the portable object 1 can be connected, at least temporarily.

In known fashion, the portable object 1 includes a memory 11 and processing circuits 12, for performing operations on the data of its memory or on data furnished from outside the portable object 1, for instance from a terminal 2.

In order for dialog to be possible between the memory and the processing circuits on the one hand and between the portable object 1 and the outside world on the other, the portable object 1 includes means 13 for interfacing with the outside world and means 14 for data exchange among the elements 11, 12, 13.

In a known manner, the exchange means 14 are transmission lines or "buses".

Preferably, the processing circuits 12 of the portable object 1 are constituted by a microprocessor and with the memory 11 form a monolithic structure. In a known manner, this structure makes it possible to obtain inviolable memories, since access to the memory zones is done under the control of the processing circuits constituted by the microprocessor.

For implementation of the invention, the memory 11 of the portable object 1 includes the following elements, for example:

- a first secret zone Sc;
- a second accessible zone Ac, accessible for reading at any moment during the life of the portable object 1, and accessible for writing at least during the phase of writing information (I) and its image(I');
- a third zone Pc containing the operating program of the circuits of the portable object 1;
- a fourth zone Lc, accessible for reading and containing nonsecret data, written when the object was manufactured, such as the serial number [Ns] of the portable object 1.

The secret zone Sc, also called the secret memory, contains exclusively data inaccessible from the outside world in the portable object 1. This inaccessible data cannot be used except by the processing circuits 12 of the portable object 1. In particular, this secret zone contains a secret datum, which is either common to all the objects intended for the same application [Si], or diversified [Sid], and which will be used to encipher the information [I] whose originality is possibly to be verified later.

This secret zone may also contain a datum constituting the "personal identification number[PIN]" of the bearer of the object. This datum is correlated with a verification datum [PIN'] which the bearer received confidentially when the object was assigned. He must sometimes enter this verification datum when he uses his object on an appropriate terminal. Correct entry leads to the assumption that the bearer is authorized.

The second zone Ac is the one in which this information [I] and its image [I'], resulting from the encipherment, are written.

Naturally the various zones may have a different electronic structure from one to another; that has no significance. Nevertheless, it must be possible to write in the second accessible zone Ac at least once after the portable object 1 has been into service, so as to write the information [I] and its image [I'] there.

The terminal 2 contains processing circuits 21, a memory 22, means for dialog with a user, including data entry means 23 such as a keyboard or other suitable device (mouse, light pen, scanner, etc.), and display means 24 (screen, printer). These various elements are connected to one another by way of way of links 29. Finally, the terminal 2 includes means 26 enabling the establishment of communication between its circuits and those of the portable object 1, by way of the interfacing means 13 of the object.

The memory 22 of the terminal 2 includes at least a first zone Pt, with the operating program of its circuits, and a second zone or working zone At, whose role will be described hereinafter.

The interfacing means 13 of the portable object 1, in the case of an electronic card, are made up in known fashion by contacts placed on one face of portable object 1. In that case, the corresponding means 26 of the terminal are constituted by an appropriate connector.

Thus the terminal 2 may be embodied by any device which has a memory and processing circuits; it may accordingly be a specific terminal 2 or a computer that is to be programmed as a consequence.

In a first embodiment, the system for employment the method includes at least one terminal 2 arranged to be capable of being used only during phases of writing information and their image into the portable objects 1, and at least one other terminal 2 arranged to be capable of being used only during phases of verification of the originality of the information in the portable objects 1, with which they are connected, so that these different phases are executed by connecting the objects to separate terminals.

In a second embodiment, the system includes at least one terminal 2 that makes possible either writing or verification of the originality of information of the portable objects 1 connected to it, or both.

The fact that a terminal 2 can execute certain phases depends solely on the programs and data that it contains, if this terminal 2 is made on the basis of a microprocessor or a computer.

As indicated above, writing information in the accessible memory of a portable object 1 is accompanied by encipherment of this information, with the aid, among other elements, of a first datum [Ks] external to the portable object 1 and furnished under the control of the person writing the information. Hence this first datum constitutes an encipherment key. To prevent a nonauthorized person from being able to use an encipherment key, this key must be either confidential or secret.

A key is called confidential if it is known to only a certain number of authorized persons and hence must be entered into the system by one or the other of these persons. A key is called secret if it is contained in a secret zone of a memory and cannot be used except by the processing circuits associated with that memory.

Consequently, a system using the terminal 2 of FIG. 1 does not enable the use of secret keys, because the terminal 2 does not contain any secret zone. Conversely, the data entry means 23 of terminal 2 enables an authorized person to enter a confidential encipherment key there.

FIG. 2 shows a variant device with which the method can be employed in part or completely.

This variant has only one difference from that of FIG. 1, and so the elements common to both figures are identified by the same reference numerals and symbols and will not be described again.

This sole difference is as follows: the memory 22 of the terminal 2 includes a third secret zone St, which is accordingly accessible only to the processing circuits of the terminal 2.

This third zone St may contain the first datum or key [Ks], used for enciphering the information and furnished under the control of the person writing the information, and/or some other datum [Kp] which also constitutes a key, required for the later verification of the originality of the information, in the case where the programs used require the use of different data.

Consequently, the encipherment and/or later verification of originality can be done without the need for any person tasked with writing and/or verification to know any key.

Naturally the mere presence of one or another of these keys in the terminal 2 is not sufficient; the terminal 2 must be adapted for this or must have a program Pt adapted as a consequence.

The possibility has been mentioned that the data or keys [Ks], [Kp] required for writing and verification may be identical or different. The existence or nonexistence of a difference between these data depends on the algorithms and systems used in the writing and verification phases. In fact, as will become apparent hereinafter, these phases require the execution of encipherment programs and decipherment programs, which use known or unknown algorithms, which may involve public keys or secret keys.

They may be identical if the verification cannot be done except by the same person or authority (human individual, or legal person) as the one that had written the information.

Conversely, if the verification is authorized for third parties, then these keys must be different. Otherwise, a person not authorized to write but who will be authorized to perform verifications could, if the verification device also includes the writing program, produce a false document that appears to be in order.

Hence in the case of algorithms with public keys, such data must be different: the encipherment is done with a secret or confidential key, while the deciphering can be done with the aid of a key the knowledge of which by any person (hence the notion of a "public" key) has no influence whatever on the security of the system.

It will be recalled that the method of the invention consists on the one hand of writing at least the information [I] and its image [I'] in the accessible memory zone Ac of the portable object 1. This image [I'] is obtained by using a protocol of encipherment of the information [I]. This protocol takes into account at least the information [I], a first datum [Ks], and a second datum [Sid], which is diversified for each portable object 1.

Secondly, it consists of verifying that an image [I'] has been obtained with the aid of the first and second data, so as to deduce from this that the associated information [I] is original.

The first datum [Ks] is taken into account by the processing circuits 21 of the terminal 2, under the control of the person or entity authorized to enter the information. This datum may be confidential; in that case, the authorized person must enter it with the aid of the keyboard of the terminal 2. It may be secret; in that case, it is permanently memorized in a secret zone St of the memory of a terminal 2.

The second datum takes into account at least one secret datum [Si] contained in the secret memory zone Sc of the portable object 1.

This second datum is diversified to enable the same information [I] that is to be written in two different portable objects 1 to have a different image [I'] in each portable object 1. It is this characteristic that makes it possible to distinguish an original from a copy.

The use of a nondiversified datum in fact makes it possible only to determine, at the time of verification, that information written in the accessible memory zone Ac of a portable object 1 is authentic, but not to distinguish between the original and the copy.

Several methods, known per se, make it possible to achieve diversification of the second datum.

A first method consists of using directly, as the second diversified datum [Sid], the secret datum [Si] of the memory of the portable object 1, which has been diversified when it was written during the manufacture or personalization of the memory of the portable object 1, before its issuance to the final user, by using a particular diversification protocol. One such protocol is described for example in U.S. Pat. No. 4,811,393 issued to the assignee of the present invention.

Another method of diversification consists, in the processing circuits of the object, of using a program Pc memorized in the object at the moment of calculation of the image [I']; this program applies, on the one hand, an encipherment function Fc to a secret nondiversified key [Si], memorized in the secret zone Sc of the memory of the object but common to all the objects, and on the other hand, to another datum of the object which is systematically diversified but is not necessarily secret, such as the serial number [Ns] of the object, contained in the zone Lc of the portable object 1 that is accessible for reading.

As indicated, a terminal 2 in accordance with that of FIG. 1 or that of FIG. 2 may be used to write information and its image, on the condition that it is adapted or contains an appropriate program; similarly, it may be used for verification of originality, on the condition that it is adapted or contains an appropriate program.

Regardless of the method employed, writing information in a portable object 1 and verifying its originality are done when the portable object 1 is connected to the suitable terminal 2.

Moreover, regardless of the system used for implementing the method, the information is entered into the accessible memory of the portable object 1 by way of data input means 23 of the terminal 2, such as the keyboard and/or any other suitable device (mouse, light pen, scanner, etc.) which is to be connected to the terminal 2.

Preferably, at the moment of its being entered, information [I] is memorized temporarily in the working zone At of the terminal 2. This temporary memorization is necessary so that its encipherment can take place, because as will be explained hereinafter, calculations take place in the terminal based on that information. When the writing phase has been completed, information and all the other specific data that it has been possible to memorize in this working zone At of the terminal 2 are erased.

The memorization not only enables encipherment; it also enables the information to be verified and then optionally modified or supplemented, if the data entry was erroneous or incomplete, before being transferred to the accessible memory zone Ac of the portable object 1.

Hence if the accessible memory Ac of the portable object 1 can no longer be modified after writing (if a PROM is used, for instance), this verification and optional modification of the contents of the accessible memory of the terminal 2 make it possible to prevent any problem that would be due to erroneous or incomplete writing in a nonmodifiable memory thereafter.

Moreover, even if the accessible memory Ac of the portable object 1 is modifiable (EEPROM, for instance), it is preferable to memorize the information in the working zone At of the terminal 2, so that it can possibly be corrected later before its transfer to the portable object 1, because what is memorized in the portable object 1 must correspond exactly to what has just been used for the encipherment. Since the encipherment is done on the basis of the information memorized in the working zone At of the terminal 2, this latter information must also be modified if the information in the accessible memory Ac of the portable object 1 has been modified after its transfer.

Moreover, regardless of the system for implementing the method, if the terminal 2 used for the writing includes a secret zone St with the encipherment key [Ks], this key will be automatically taken into account, without the operator (person or authority) who is authorized to write the information having to enter it by way of the data entry means of the terminal 2.

Conversely, if the terminal 2 used does not include a secret zone St with the encipherment key [Ks], then this key must be entered by the authorized operator with the aid of the data entry means of the terminal 2.

The same will be true for the verification key [Kp], if it is different from the encipherment key [Ks]: If it is memorized in a secret zone of a verification terminal 2, then it will automatically be taken into account without the operator authorized to perform the verification having to enter it by way of the data entry means of the terminal 2; if it is not memorized, then it must be entered by the authorized operator, using the data entry means of the terminal 2.

Several variants can be contemplated for implementing the method, but for each one the operations of writing information and its image will be initialized by an authorized operator, when the portable object 1 is connected to the terminal 2.

FIGS. 3–7, with the aid of arrows, show the essential flow of data or information in the various embodiments of the invention.

Figure 3:
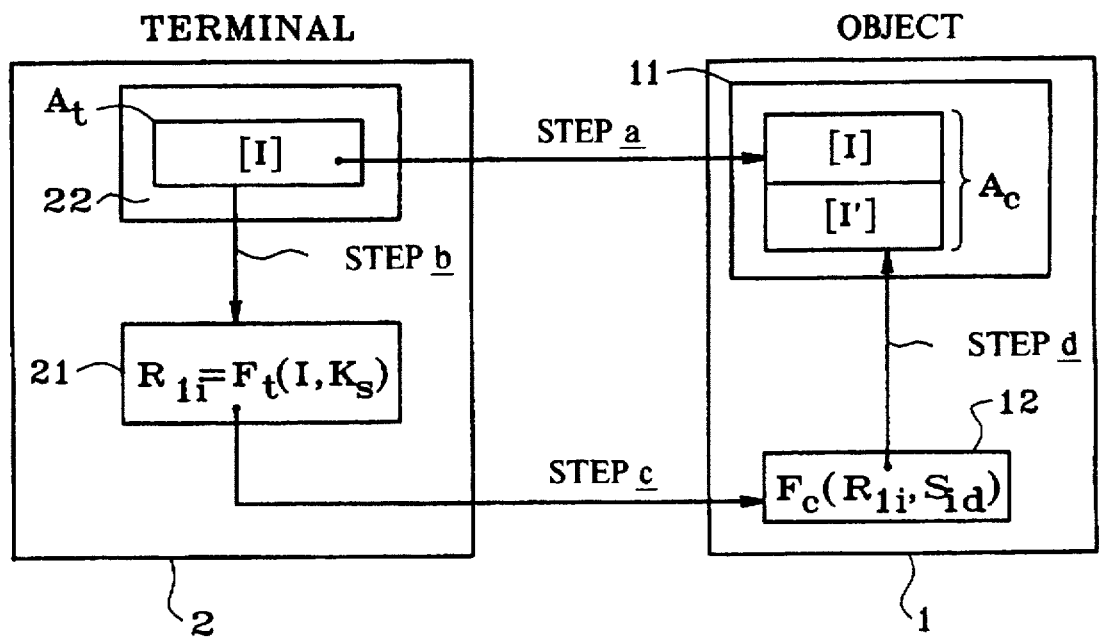
FIG. 3 shows one mode of employing steps of writing information and its image.
Figure 4:
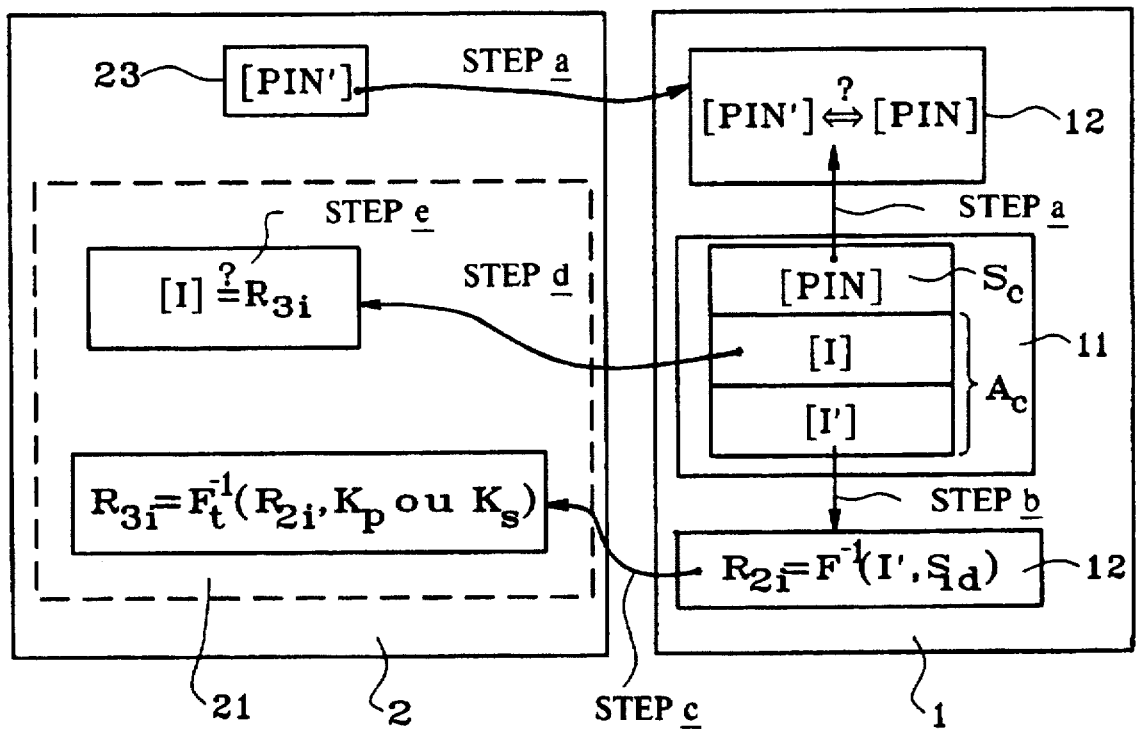
FIGS. 4 and 5 show two variants of the steps of verification of originality and authenticity of information that has been written by using the steps of FIG. 3.
Figure 5:
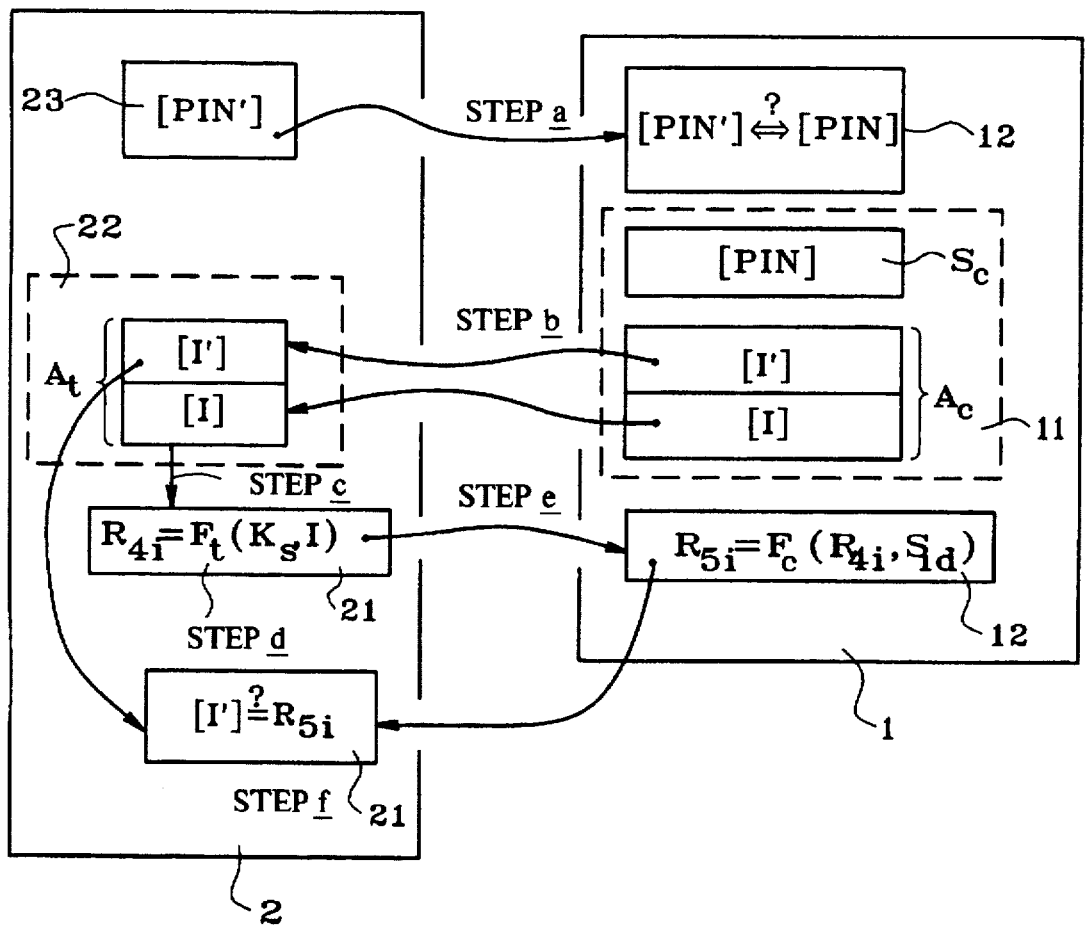

A first embodiment of the method is shown in FIGS. 3–5. Writing information and its image are illustrated by FIG. 3.

Information [I] whose originality must be verified thereafter is on the one hand entered by the authorized operator and then memorized in the working memory zone At of the terminal 2, and on the other hand is transferred to the accessible memory zone Ac of the portable object 1, so as to be written there in the course of a first step a. Preferably, as described above, the transfer is done after possible modification of the contents of the working zone At of the terminal 2, rather than directly at the moment of entry of the data making up the information [I].

The information memorized in the working memory zone At of the terminal 2 is then enciphered, in the processing circuits 21 of the terminal 2, with the aid of the program [Pt] contained in this terminal 2 (in the course of a step b). This program employs an encipherment function Ft that takes this information and the encipherment key [Ks] into account, so as to obtain an intermediate result R1i that is a function of the key and of the information and can be written as follows: R1i=Ft(I, Ks).

Then this intermediate result R1i is transmitted (in the course of a step c to the processing circuits 12 of the portable object 1, in which an encipherment function Fc, employed by a program [Pc] contained in the circuits, is applied there. This function takes into account not only this intermediate result R1i but also the second diversified datum [Sid] of the portable object 1, which is obtained by implementing one or another of the diversification methods discussed above.

A result [I'], which is the enciphered image of the information, is then obtained by means of the first datum (key [Ks]) and the second diversified datum [Sid] of the portable object 1, which in turn is the function of a secret key [Si] of this object, and this can be written as follows:

[I']=Fc(R1i, Sid);
or [I']=Fc(Ft(I, Ks), Sid);
or, by definition, [I']=Fc((I, Ks), Sid).

This image [I'] is then transferred (in the course of a step d) to and written in the accessible memory zone Ac of the portable object 1, in such a way that this zone contains both the information [I] and its image [I']. Finally, the information that was memorized, at the beginning of this phase, in the working zone At of the terminal 2 is erased. The writing phase is thus terminated.

At least two variants can be contemplated for verifying the originality of information written in accordance with this first embodiment.

The first variant is shown in FIG. 4. It includes five steps, numbered a–e.

The first step a is optional and cannot take place unless the secret memory Sc of the portable object 1 contains a personal identification number [PIN] of the bearer. It consists of verifying the authorization of the bearer. In a known manner, to do so, the bearer enters the verification datum [PIN'] of his personal identification number, for instance with the aid of the keyboard that is part of the data entry means 23 of the terminal 2. This correlated datum is transmitted to the processing circuits of the portable object 1, which perform the appropriate processing. In the event of nonagreement, the verification process stops.

The verification then consists of causing the processing circuits of the portable object 1 (in the course of a step b) to execute a program of deciphering of the image [I'] written in its accessible memory zone Ac. This program causes the application, to the image [I'] and the second diversified datum [Sid], of the deciphering function $F^{-1}c$ corresponding to the encipherment function Fc that had been applied to the first intermediate result R1i in the portable object 1.

A second intermediate result R2i=$F^{-1}c$(I', Sid) is obtained, which if the portable object 1 is the one in which the information [I] and its image [I'] were initially written is equal to the first intermediate result [R1i]. This second intermediate result R2i is then transmitted (in the course of a step c to the processing circuits of the terminal 2, in which the decipherment function $F^{-1}t$ corresponding to the encipherment function Ft that had been applied to the information [I] in the terminal 2 is applied to this second intermediate result R2i and to the appropriate decipherment key [Ks] or [Kp], memorized in the secret zone Ft of the terminal 2 or entered by the authorized operator.

Consequently, because the successive operations of decipherment employed during the verification are the correlary of the encipherment operations employed during the writing, a final result [R3i] is obtained, which if the information contained in the portable object 1 is authentic is this information [I] itself.

For this reason, the information [I] contained in the accessible memory zone Ac of the portable object 1 is transferred (in the course of a step d) to the processing circuits of the terminal and then (in the course of a step e compared with this final result R3i. In the event of equality, the information contained in the accessible memory zone Ac of the portable object 1 is declared to be original.

A second variant for verification is illustrated by FIG. 5.

It includes a first optional step a, which consists of verifying the authorization of the bearer when the secret memory Fc of the portable object 1 contains a personal identification number [PIN] of the bearer. It proceeds as described in conjunction with FIG. 4.

A second step b consists of transfer of the information [I] and its image [I'], which are contained in the accessible memory zone Ac of the portable object 1, to the working memory zone At of the terminal and the temporary memorization of these data in this zone.

The information [I] thus memorized in the working memory zone At of the terminal 2 is then enciphered (in the course of a step c) by its processing circuits, using the encipherment program Pt, memorized in the terminal 2, that made it possible to obtain the first intermediate result R1i in the writing phase, that is, the program that implements the encipherment function Ft that takes the key [Ks] into account.

Another intermediate result R4i is obtained in the terminal 2, which (in the course of a step d) is transmitted to the processing circuits of the portable object 1, in which circuits the encipherment function Fc, which had been used in the writing and which is implemented by the program [Pc] contained in the circuits of the portable object 1, taking the diversified datum [Sid] into account, is applied there.

The successive operations of encipherment of the information [I], in the form in which it has been reread in the accessible memory zone Ac of the portable object 1, and which are performed at the time of this verification, are identical to those implemented in the writing. Accordingly, a final result R5i is obtained, which if the information contained in the portable object 1 is authentic, and if the data carrier is the one that was used in the writing, corresponds to the image [I'] that had been calculated and memorized in the accessible zone Ac with the information [I] in the writing phase. This final result R5i is retransmitted (in the course of a step e) to the circuits of the terminal 2, in which (in the course of a step f) it is compared with the image [I'] which had been memorized in its working memory zone At at the beginning of the verification phase. In the event of equality, the information is declared to be original.

This first embodiment, with its various variants for verification, is not completely satisfactory, because on the one hand, it does not make it possible to distinguish between information that is authentic but is recopied to a different data carrier from the original one, and completely false or modified information. In all these cases, the result of the comparison will be the same: the information will be declared false.

This embodiment makes it possible simply to determine that information is original.

Secondly, the writing or verification variants require that the processing circuits of the portable objects may be called upon to encipher or decipher data (the information [I] and/or its image [I']), which may be of variable or great size, and this cannot be accomplished even by all the processing circuits of known portable objects 1.

In general, in fact, the processing circuits of known objects are designed to perform the operations of encipherment or decipherment on data of fixed and often reduced size.

For this reason, another embodiment of the invention is contemplated, which enables a distinction to be made between the original, the copy and the false one, and which is applicable to any type of object that contains at least one secret datum [Si] and has at least one elementary encipherment function enabling it to obtain a result that is a function of this secret datum and at least one other datum of conventional size in the objects.

This second embodiment is illustrated, in its preferential use, by FIGS. 6 and 7. The various steps in the writing are illustrated in FIG. 6 and those of the verification in FIG. 7.

The writing can be summarized in five separate steps, numbered a to e in FIG. 6.

In a first step a, a datum Et is worked out and transmitted form the terminal 2 to the processing circuits of the object. In addition, this datum is temporarily memorized in the working zone At of the terminal 2.

A program of encipherment of this datum Et is then employed in the object, which applies an encipherment function Fc to this datum Et and to a diversified datum, contained either in the secret zone Sc of the object or obtained by implementing one or the other of the diversification methods mentioned above.

An intermediate result R 1=Fc(Et, Sid) is obtained, which is transmitted in a second step b to the working zone At of the terminal 2, in which it is memorized temporarily.

In addition, the information [I], after having been optionally reviewed and corrected, is on the one hand memorized temporarily in the working zone At of the terminal 2 and on the other, in a third step c, transmitted to the accessible zone Ac of the portable object 1 in which it is memorized.

At the end of this third step, the working zone At of the terminal 2 includes a data block made up of the information [I], the datum Et, and the result R1 of the encipherment of this datum Et done beforehand in the portable object 1.

In a fourth step d, an encipherment program Pt is executed in the processing circuits of the terminal 2, and this program employs an encipherment function Ft applied to this block and to an encipherment key [Ks].

As indicated above, this encipherment key [Ks] is either contained in a secret zone St of the terminal 2 and managed by its processing circuits, or is entered by the authorized operator.

By definition, one result is obtained: this is the enciphered block, which is accordingly an image [I'] of the information [I]. In fact, the final phase of encipherment is applied to the data block, which among other data includes this information [I]. In addition, this image [I'] is a function of the encipherment key [Ks] of the terminal, and hence of a first datum under the control of the authorized person, since it is this key that has been applied to the block during the final step described; finally, this image [I'] is a function of the diversified datum [Sid] of the portable object 1, since the block that was enciphered in the final step contains the result R1 obtained by enciphering the datum Et and with the aid of this diversified datum [Sid].

This can be expressed by the following equation:

$$[I']=Ft(I, Ks, Sid).$$

Finally, in a fifth step e, this enciphered block making up the image [I'] of the information [I] is written in the accessible zone Ac of the portable object 1, in such a way that at the end of these steps, this zone does contained both the information [I] and its image [I'].

Then the contents of the working zone At of the terminal 2 are erased.

It is the use of the datum Et, transmitted in the first step a, which makes it possible to use the method with any portable object 1 that has memory and processing circuits, such as a microcomputer card, unlike the first embodiment described. In fact, the format of this datum may be chosen so as to be compatible with the possibilities of encipherment of all the usual microcomputer cards.

Preferably, this datum Et is worked out in random fashion by the processing circuits of the terminal, using some suitable means such as a data generator and/or random number generator known per se and incorporated into it.

This makes it possible to prevent the same information [I], which is capable of being written at least twice in the same portable object 1, from having the same image [I'] twice.

Hence the possibilities of fraud no longer exist. This precaution is useful, for instance when the information relates to a right that must be reviewed, an example being a monetary value when the object is a payment card.

The use of a random number supplements the use of the diversified datum, which itself prevents obtaining the same results in two different objects.

The preferred embodiment for verifying the originality of a datum contained in the accessible memory zone Ac of the portable object 1 is illustrated by FIG. 7.

This embodiment can be summarized in eight steps, numbered a–h, in this figure.

The first step a is optional and consists of the verification of authorization of the bearer when the secret memory Sc of the portable object 1 contains a personal identification number [PIN] of the bearer. It proceeds as described in conjunction with FIG. 4.

A second step b consists of copying to the working zone At of the terminal 2, from the accessible memory zone Ac of the portable object 1, the information [I] and its image [I'] that are contained there.

A third step c consists of causing the processing circuits of the terminal 2 to apply to the image [I'] and to a decipherment key [Ks] or [Kp] a decipherment function $F^{-1}t$, corresponding to the encipherment function Ft that was used in the fourth step of the writing phase. This decipherment makes it possible (step d) to obtain a block of three data [I"], [E't], [R'1], which can be distinguished from one another.

Three cases can arise.

The first is the one in which the information [I] contained in the card and the image [I'] are original.

In this instance, the block obtained by decipherment is identical to the one that was used during the encipherment. Consequently:

the first datum [I"] corresponds to the original information [I] additionally transmitted in the clear from the object to the terminal;

the second datum [E't] corresponds to the datum [Et] that was transmitted, in the writing phase, from the terminal 2 to the processing circuits of the object 1 and then enciphered to yield the result [R1];

the third datum [R11] corresponds to the result [R1] effectively calculated by the circuits of this object in the writing phase, which result can be obtained again by applying the encipherment function Fc of the object to the second datum [E't] produced by the decipherment.

The second case is the one in which information [I] and its image [I'] have been copied to a different data carrier from the original one.

In that case, since the image [I"] read in the portable object 1 was obtained by a proper procedure, in other words by using the correct encipherment key [Ks], the deciphered block corresponds to the one that was used for the encipherment in the writing phase in the original portable object 1.

Consequently, the first datum [I"] corresponds to the information [I], and the second and third data [E't] and [R"1] correspond to those [Et], [R1] that were used in the encipherment in the original object. However, applying the encipherment function Fc, contained in the portable object 1, to the second datum E't does not make it possible to retrieve the third datum [R'1].

The third case is the one in which the information does not correspond to information initially written by an authorized person.

In that case, there is no coherence whatever between the deciphered data and the data of the block that were used for the encipherment. No correspondence whatever can be established between them.

In the light of the above, the verification phase is extended by the following steps:

A fifth step e consists of effecting comparison, by the processing circuits of the terminal 2, of the first datum [I"] produced by the decipherment and the information [I] as it was copied from the accessible memory zone Ac of the portable object 1 to the working zone At of the terminal 2 during the second step b of the verification phase.

In the case of nonequality between the first datum [I"] and the information [I], the object is declared to include information not written by an authorized person, and the verification is stopped.

In the case of equality, meaning that the portable object 1 includes information written by an authorized person, the second datum [E't] is transmitted from the terminal 2 to the processing circuits of the object 1 in a sixth step f.

The encipherment program contained in the portable object 1 is then employed, in a step g, which applies the encipherment function Fc to this datum [E't] and to the diversified datum [Sid], in such a way as to obtain a final result $[R"1]=Fc(E't, Sid)$, which if the object is the original data carrier must correspond to the third datum [R'1] deciphered in the fourth step d.

In fact, because a diversified datum has been used, only the original object is capable of furnishing the same result.

The final result [R"1] is then transmitted to the processing circuits of the terminal 2, in which it is compared, in the course of an eighth step h, to the third datum [R'1] produced by the decipherment.

The agreement between the final result [R"1] and the third datum [R'1] signifies that the object is original; nonagreement signifies the presence of a copy.

Suitable means, not shown and for example acting upon the display means 24 (screen, printer), can then be employed in the terminal 2 to indicate to the authorized person tasked with the verification that the object presented is an original or a copy.

Accordingly, the invention can easily be employed in all fields where it is necessary to assure the originality of a document. For example, it is applicable to the constitution and verification of identity documents or any other identification documents (driver's licenses, passport and the inscription of visas in them, vehicle registration certificates, etc.); by using algorithms with public keys and the variant of FIGS. 6 and 7, writing information in these documents may be done by authorized persons with the aid of a secret or confidential key, while the verification of their originality could at an extreme be done by anyone having the appropriate terminal and with knowledge of the decipherment key.

For example, in an extreme case, anyone can verify that an identity document or the like presented to him is original, without giving him the opportunity of means for counterfeiting or of making such a document that would appear original. Accordingly, the system could include multiple verification devices, in the form of terminals at the disposal of the public, which would have no need to be interconnected.

It is understood that it is entirely possible for the verification to be authorized in restricted form, only to authorized persons.

Another advantage of the invention is the following: the terminals used for the writing and for the verification may be completely independent of one another. It suffices for them to be consequently adapted or to have the proper programs. Hence they may be portable, or stationary, or carried in vehicles, etc.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the spirit and scope of the invention as set forth herein and defined in the claims.

I claim:

1. A method for writing information in a data carrier, comprising the steps of:

using a portable electronic object as the data carrier;

writing, on request of an authorized person and when the object is connected to a terminal, the information in an accessible memory zone of the object that is writable and accessible for at least reading after having been written;

calculating an image of the information and a secret datum wherein said external datum is externally provided to the object by said authorized person and said secret datum is specific to the object and stored in a secret memory zone of the object; and writing the image in said accessible memory zone of the object.

2. The method of claim 1, further including the step of verifying the information contained in said accessible memory zone of the object by:

connecting the object to a terminal; and determining that the image resulting from the encipherment of information with said encipherment function has been obtained by using said external datum and said secret datum.

3. The method of claim 1, further including:

writing the information in the accessible memory zone of the object, and storing the information in a memory zone of the terminal;

enciphering in the terminal the information by an encipherment function using the external datum as an encipherment key to obtain an intermediate result;

enciphering said intermediate result by said encipherment function of the object using said secret datum to obtain said image;

writing the image in said accessible memory zone of the object; and erasing the information in the memory zone of the terminal.

4. The method of claim 3, further including verifying the information contained in said accessible memory zone of the object by connecting the object to a terminal and determining that the image resulting from the encipherment of information with said encipherment function has been obtained by using said external datum and said secret datum, said method further comprising the steps of:

reading the information and the image contained in the accessible memory zone of the object, and storing the information and the image in a memory zone of the terminal;

obtaining an intermediate result in the terminal by enciphering the information with the encipherment function by using the external datum;

transmitting said intermediate result to the object and applying to said intermediate result the encipherment function using the secret datum to obtain a final result which, if the information contained in the object is original, corresponds to the image contained in the accessible memory zone of the object; and transmitting the final result to the terminal, comparing the final result with the image stored in the memory zone of the terminal and, if the final result is identical to the image, deducing that the information contained in the object is original.

5. The method of claim 3, further including verifying the information contained in said accessible memory zone of the object by connecting the object to a terminal and determining that the image resulting from the encipherment of information with said encipherment function has been obtained by using said external datum and said secret datum, said method including the steps of:

obtaining an intermediate result in the object by deciphering said image of the object with a decipherment function corresponding to said encipherment function and using said secret datum, and transmitting said intermediate result to the terminal;

obtaining a final result in the terminal by deciphering said intermediate result with a decipherment function derived from said encipherment function and using said external datum and another datum which is linked with said external datum; and comparing the final result to the information and, if the final result is identical to the information, deducing that said information contained in the object is original.

6. The method of claim 1, further including the steps of:

transmitting an auxiliary datum to the object, and storing the auxiliary datum in a memory zone of the terminal;

enciphering in the object the auxiliary datum by said encipherment function using the secret datum as an encipherment key to obtain an intermediate result and transmitting the intermediate result to the memory zone of the terminal;

transmitting and writing the information in the accessible memory zone of the object, and storing the information in the memory zone of the terminal;

enciphering in the terminal a block of data comprising the information, the auxiliary datum, the intermediate result, and the external datum with an encipherment function to obtain a result that constitutes said image of the information;

transmitting the image to the object and writing the image in the accessible memory zone of the object; and erasing the data, results and information stored in the memory zone of the terminal.

7. The method of claim 6, further including the step of using an auxiliary datum which is random.

8. The method of claim 6, further including verifying the information contained in said accessible memory zone of the object by connecting the object to a terminal and determining that the image resulting from the encipherment of information with said encipherment function has been obtained by using said external datum and said secret datum, said method further including the steps of:

copying the information and the image from said accessible memory zone of the object to the memory zone of the terminal;

obtaining a first, second and third datum in the terminal by deciphering said image with a decipherment function corresponding to said encipherment function using at least one of said external datum and a linked datum linked with said external datum; and comparing, in the terminal, the first datum originating from the decipherment to the information of the memory zone of the terminal and, if the first datum is identical to the information, deducing that said information contained in the object is original.

9. The method of claim 8, wherein if the first datum is identical to the information, said method further includes:

transmitting the second datum to the object;

obtaining a final result in the object by enciphering said second datum with the encipherment function and using said secret datum, and transmitting said final result to the terminal; and comparing, in the terminal, the final result to the third datum and, if the final result is identical to the third datum, deducing that said information contained in the object is original.

10. A method for writing information in a data carrier by a person representative of an authority, comprising the steps of:

defining a first datum and a second, secret datum both being representative of said authority;

calculating an image of said information by enciphering said information with a predetermined encipherment function using said first datum and said second, secret datum;

using as the data carrier a portable electronic object having cipher means performing said encipherment function or a corresponding decipherment function, an accessible memory portion which is writable and accessible for at least reading after having been written, and a secret memory portion storing said second, secret datum;

writing, on request of said person representative of said authority and when the object is connected to a terminal, the information together with said image in said accessible memory portion.

11. The method of claim 10, further including the step of verifying the information contained in said accessible memory portion of the object by:

connecting the object to a terminal; and determining that the image resulting from the encipherment of information with said encipherment function has been obtained by using said first datum and said second, secret datum.

12. The method of claim 10, further including:

writing the information in the accessible memory portion of the object, and storing the information in a memory portion of the terminal;

enciphering in the terminal the information by an encipherment means using the first datum as an encipherment key to obtain an intermediate result;

enciphering said intermediate result by said cipher means of the object using said second, secret datum to obtain said image;

writing the image in said accessible memory portion of the object; and erasing the information in the memory portion of the terminal.

13. The method of claim 12, further including verifying the information contained in said accessible memory portion of the object by connecting the object to a terminal and determining that the image resulting from the encipherment of information with said encipherment function has been obtained by using said first datum and said second secret datum, said method further comprising the steps of:

reading the information and the image contained in the accessible memory portion of the object, and storing the information and the image in a memory portion of the terminal;

obtaining an intermediate result in the terminal by enciphering the information with the encipherment means by using the first datum;

transmitting said intermediate result to the object and applying to said intermediate result the cipher means performing said encipherment function using the second secret datum to obtain a final result which, if the information contained in the object is original, corresponds to the image contained in the accessible memory portion of the object; and transmitting the final result to the terminal, comparing the final result with the image stored in the memory portion of the terminal and, if the final result is identical to the image, determining that the information contained in the object is original.

14. The method of claim 12, further including verifying the information contained in said accessible memory portion of the object by connecting the object to a terminal and determining that the image resulting from the encipherment of information with said cipher means has been obtained by using said first datum and said second, secret datum, said method including the steps of:

obtaining an intermediate result in the object by deciphering said image of the object with a decipherment function corresponding to said encipherment function and using said second, secret datum, and transmitting said intermediate result to the terminal;

obtaining a final result in the terminal by deciphering said intermediate result with a decipherment means using at least one of said first datum and another datum which is linked with said first datum; and comparing the final result to the information and, if the final result is identical to the information, determining that said information contained in the object is original.

15. The method of claim 10, further including the steps of:

transmitting an auxiliary datum to the object, and storing the auxiliary datum in a memory portion of the terminal;

enciphering in the object the auxiliary datum by said cipher means using the second, secret datum as an encipherment key to obtain an intermediate result and transmitting the intermediate result to the memory portion of the terminal;

transmitting and writing the information in the accessible memory portion of the object, and storing the information in the memory portion of the terminal;

enciphering in the terminal a block of data comprising the information, the auxiliary datum, the intermediate result, and the first datum with an encipherment means to obtain a result that constitutes said image of the information;

transmitting the image to the object and writing the image in the accessible memory portion of the object; and erasing the data, results and information stored in the memory portion of the terminal.

16. The method of claim 15, further including verifying the information contained in said accessible memory portion of the object by connecting the object to a terminal and determining that the image resulting from the encipherment of information with said encipherment means has been obtained by using said first datum and said second, secret datum, said method further including the steps of:

copying the information and the image from said accessible memory portion of the object to the memory portion of the terminal;

obtaining a third, fourth and fifth datum in the terminal by deciphering said image with a decipherment means corresponding to said encipherment means using at least one of said first datum and a linked datum linked with said first datum; and comparing, in the terminal, the third datum originating from the decipherment to the information of the memory portion of the terminal and, if the third datum is identical to the information, determining that said information contained in the object is original.

17. The method of claim 16, wherein if the third datum is identical to the information, said method further includes:

transmitting the fourth datum to the object;

obtaining a final result in the object by enciphering said fourth datum with the cipher means and using said second, secret datum, and transmitting said final result to the terminal; and comparing, in the terminal, the final result to the fifth datum and, if the final result is identical to the fifth datum, determining that said information contained in the object is original.

18. A portable electronic object, comprising:

an accessible memory portion which is accessible for at least reading, means for enabling information to be memorized on request of a person representative of an authority in said accessible memory portion, and means for enabling an image of said information to be memorized in said accessible memory portion, wherein said image is defined by an encipherment of the information with a predetermined encipherment function using a first datum and a second, secret datum both being representative of said authority;

a secret memory portion storing said second, secret datum; and cipher means for performing a predetermined encipherment function which is identical to said predetermined encipherment function or a corresponding decipherment function.

* * * * *